(12) United States Patent
Er et al.

(10) Patent No.: US 8,250,045 B2
(45) Date of Patent: Aug. 21, 2012

(54) NON-INVASIVE USAGE TRACKING, ACCESS CONTROL, POLICY ENFORCEMENT, AUDIT LOGGING, AND USER ACTION AUTOMATION ON SOFTWARE APPLICATIONS

(75) Inventors: Chiang Kai Er, Singapore (SG); Chee Meng Low, Singapore (SG); Sharad Ganesh, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 12/526,451

(22) PCT Filed: Feb. 7, 2007

(86) PCT No.: PCT/SG2007/000039
§ 371 (c)(1),
(2), (4) Date: Aug. 7, 2009

(87) PCT Pub. No.: WO2008/097191
PCT Pub. Date: Aug. 14, 2008

(65) Prior Publication Data
US 2010/0325097 A1    Dec. 23, 2010

(51) Int. Cl.
*G06F 7/00*    (2006.01)
(52) U.S. Cl. ...................................................... 707/702
(58) Field of Classification Search ................... 709/223
See application file for complete search history.

(56) References Cited

U.S. PATENT DOCUMENTS

| 5,861,885 | A | * | 1/1999 | Strasnick et al. | 715/850 |
|---|---|---|---|---|---|
| 6,141,006 | A | * | 10/2000 | Knowlton et al. | 705/27.1 |
| 6,823,452 | B1 | | 11/2004 | Doyle et al. | |
| 7,209,964 | B2 | * | 4/2007 | Dugan et al. | 709/223 |
| 7,593,942 | B2 | * | 9/2009 | Sack et al. | 1/1 |
| 2002/0144110 | A1 | | 10/2002 | Ramanathan | |
| 2002/0144119 | A1 | | 10/2002 | Benantar | |
| 2004/0229199 | A1 | * | 11/2004 | Ashley et al. | 434/323 |
| 2005/0278270 | A1 | * | 12/2005 | Carr et al. | 706/25 |
| 2006/0119586 | A1 | * | 6/2006 | Grant et al. | 345/173 |
| 2006/0248083 | A1 | * | 11/2006 | Sack et al. | 707/9 |
| 2007/0115993 | A1 | * | 5/2007 | Cohen | 370/392 |
| 2007/0294416 | A1 | * | 12/2007 | Agre et al. | 709/229 |

OTHER PUBLICATIONS

International Search Report and Written Opinion dated May 3, 2007 for International Application No. PCT/SG2007/000039, 9 pages.

* cited by examiner

*Primary Examiner* — Rehana Perveen
*Assistant Examiner* — Masoud S Hakami
(74) *Attorney, Agent, or Firm* — Stephen J. Walder, Jr.; Jeffrey S. LaBaw

(57) ABSTRACT

The present system, software, and methods relate to computer system security, particularly to tracking and controlling electronic access to legacy applications and data records without modifying the legacy applications or records. The present system, software, and methods allow for implementation of complex access audit and control rules even when the continued use of legacy application and data are required.

19 Claims, 2 Drawing Sheets

NON-INVASIVE USAGE TRACKING, ACCESS CONTROL, POLICY ENFORCEMENT, AUDIT LOGGING, AND USER ACTION AUTOMATION ON SOFTWARE APPLICATIONS

TECHNICAL FIELD

The present invention relates to computer system security, particularly to tracking and controlling electronic access to legacy applications and data records without modifying the legacy applications or records. The present system, software, and methods allow for implementation of complex access audit and control rules even when the continued use of legacy application and data are required.

BACKGROUND

The Health Insurance Portability and Accountability Act (HIPAA), Sarbanes-Oxley (SOX), Gramm Leach Bliley Act (GLBA), and International Standards Organization (ISO) 17799 all require protection and tracking of data access. These regulations not only require fine-grain auditing of application access and usage, but may also require the ability to track complex access patterns across applications and across end points in real-time. Meeting these requirements can be difficult because, for example:

- Many legacy applications either cannot be modified (e.g., because the applications no longer have vendor support), are difficult to modify (e.g., because they are commercial, off-the-shelf software), or are in languages, such as Cobol, C++, etc., in which many contemporary artisans are no longer fluent, if conversant. Some compliance solutions rely on back-end modifications to systems in order to log activities, and hence, would not be able to handle such legacy applications.
- Some applications do not have sufficient access control mechanisms. For example, many applications cannot control access based on a user's role or granted rights, the time of day, the context of the access, etc. For example, some applications have access control mechanisms that are set locally for each machine or each application, and cannot be centrally managed on one server.
- Some applications do not maintain audit logs of user access and actions, or may not have sufficiently fine-grain logging of access, e.g., the applications cannot monitor access to a particular screen, or particular data, such as a patient's medical information.
- Some applications maintain audit logs of user access and actions, but the audit logs can be modified by a technically-skilled person without being detected, so as to conceal unauthorized actions.
- Where applications maintain their own audit logs, it may not be possible to have a centralized view of all audit logs, making real-time cross-application compliance checking difficult.
- Some applications lack alert mechanisms for when users perform unauthorized operations. Even if alert mechanisms are available, not all applications may support the administrators' preferred alert channels/methods.
- Access audit and control mechanisms may not be effective for tracking and controlling access to files, printers, scanners, etc.

Certain aspects of the present invention address these needs.

SUMMARY

The following aspects and embodiments thereof described and illustrated below are meant to be exemplary and illustrative, not limiting in scope.

In one aspect, software for tracking and controlling access to legacy applications and/or related data records on a computer system is provided, the software using a state engine to define a set of states, triggers, and actions for use by an access agent running on an access point of the computer system to track and control user access to the legacy applications and/or related data records without modifying the legacy application and/or related data records.

In some embodiments, the access agent comprises a rule-based engine for defining states, triggers, and actions for use in tracking and controlling the legacy applications.

In some embodiments, the access agent comprises:

one or more access profiles with instructions for identifying the legacy application and specifying one or more state engines for tracking and controlling access to the application, the state engine specifying the set of states, triggers, and actions for tracking and controlling access to the legacy application.

In some embodiments, the access agent further comprises a rule-based engine for defining states, triggers, and actions for use in tracking and controlling the legacy applications.

In some embodiments, the access agent comprises an audit logging module for recording user access to the legacy application. In particular embodiments, the logging module reports audit logs to a server, to which the access agent is in communication. In some embodiments, the instructions for the logging module to report audit logs to the server are provided in access profiles.

In a particular aspect, the software for tracking and controlling electronic access to legacy applications and/or related data records on a computer system without modifying the legacy applications and data records, are provided, the software comprising:

an access agent running on an access point in the computer system and controlling user access to legacy applications and related data records, the access agent comprising:

one or more access profiles with instructions for identifying a legacy application and specifying one or more state engines for tracking and controlling access to the application, the state engine specifying a set of states, triggers, and actions for tracking and controlling access to the legacy application, wherein the access agent tracks and controls user access to legacy applications and related data records without modifying the legacy application.

In another aspect, a computer method for tracking and controlling electronic access to a legacy application or related data records running on a computer system, without modifying the legacy applications or data records is provided, the method comprising:

defining a set of states, triggers, and actions for tracking and controlling access to the legacy application, and controlling user access to the legacy application and related data records using the states, triggers, and actions, wherein user access to the legacy applications and data records is tracked and controlled without modifying the legacy applications and data records.

In some embodiments, the states, triggers, and actions are used by an access agent running on an access point of the computer system to track and control access to the legacy application.

In some embodiments the states, triggers, and actions are specified by one or more state engine specifications in an access profile for use by the access agent running on an access point of the computer system to track and control access to the legacy application.

In another aspect, a system for tracking and controlling access to a legacy application in a network computer environment is provided, the system comprising:

a computer-implemented access agent running on an access point in a network computer environment controlling user access to a legacy application and related data records, the access agent comprising:

one or more access profiles with instructions for identifying a legacy application and specifying one or more state engines for tracking and controlling access to the application, the state engine specifying a set of states, triggers, and actions for tracking and controlling access to the legacy application, wherein the access agent tracks and controls user access to the legacy application and related data records using the states, triggers, and actions specified by the state engine, without modifying the legacy application.

In some embodiments, the access agent is in communication with a server. In particular embodiments, the server stores user attributes and policies for use by the access agent. In some embodiments, the server stores access profiles, and the access agent periodically synchronizes access profiles with the server.

In some embodiments, the access agent further comprises a general rule-based engine for defining states, triggers, and actions for use in tracking and controlling legacy applications for which access profiles have not been defined.

In some embodiments, the access agent further comprises an audit logging module for recording user access to the legacy application. In particular embodiments, the logging module reports audit logs to the server.

In some embodiments, instructions for the logging module to report audit logs to the server are provided in access profiles.

In some embodiments, the logging module accumulates audit logs when it is not connected to the server; thereby allowing the tracking of access to applications even if the computer is offline or the server is down. In particular embodiments, the logging module accumulates audit logs in an encrypted form.

In some embodiments, one or more triggers is determined by information selected from a company/organization policy, a user attributes, and historical context.

In particular embodiments one or more actions is selected from disabling a widget in a window, hiding a widget in a window, closing a widget in a window, disabling a menu item in a window, disabling a sub-menu item in a window, blocking a keyboard input to a window, blocking a widget in a window, blocking a mouse input to a window, and blocking a widget in a window. The window may be in the background or in the foreground.

In addition to the exemplary aspects and embodiments described above, further aspects and embodiments will become apparent by reference to the drawings and by study of the following descriptions.

DETAILED DESCRIPTION

I. Definitions

Figure 1:
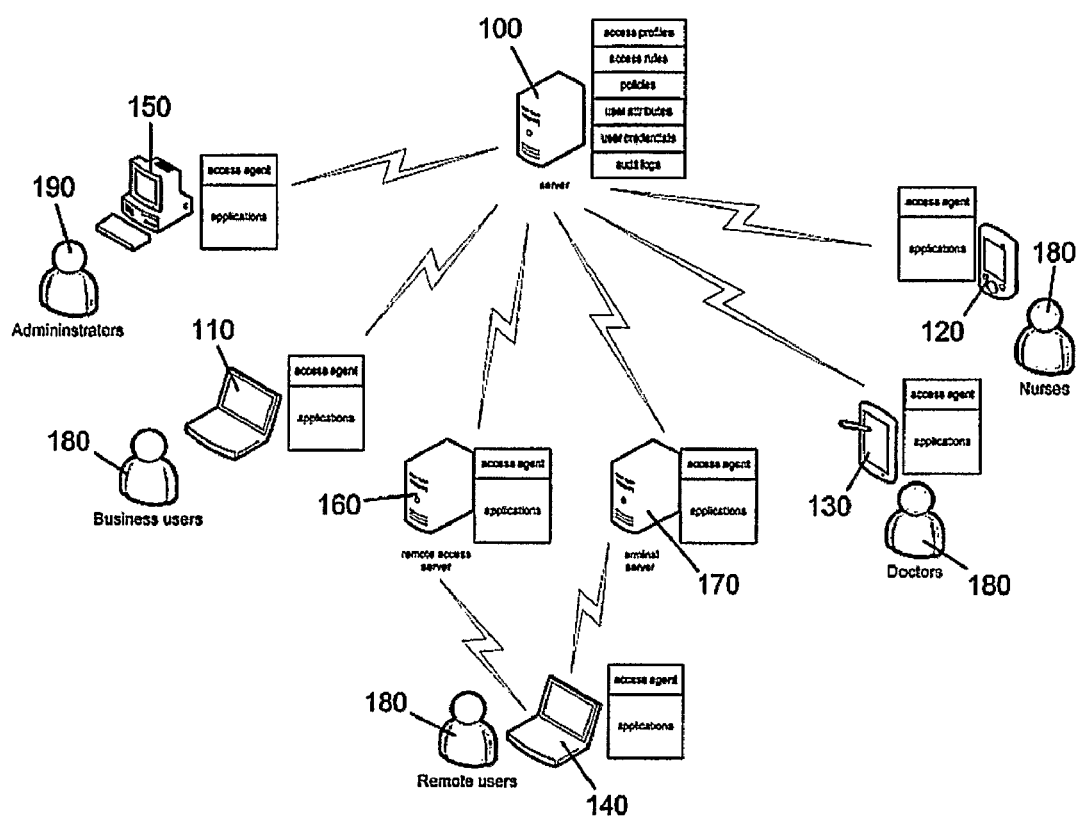
FIG. 1 is a diagram showing the main components of the system and method.

As used herein, an "action" may be an event performed in response to a trigger.

Examples of actions include automatically filling-in or recording user name and password information as soon as a logon window appears for a particular application; immediately closing a window following unauthorized access to an application or file; alerting the system administrator when an unauthorized user tries to read confidential information; etc. Some actions manipulate the application so as to change the behavior of the application, e.g., disabling a button or a menu option. A system may provide a comprehensive set of pre-defined actions as well as a flexible plug-in framework (i.e., for the use of plug-in platforms) to allow administrators to define and perform new actions.

As used herein, "legacy applications" include computer programs, platforms, operating systems, and related data records that represent earlier technology and have been inherited by a contemporary computer system. While the applications remain useful to a company or organization, these legacy applications often lack features for interfacing with contemporary computer systems, particularly with respect to access control and tracking.

As used herein, an "access point" may be a location at which instructions can be provided to a computer system, such as a network server, to control all or part of its operation. The access point may be the server, itself, or another computer in communication with the server and able to direct server functions. An access point may also be a software from which other software can be accessed, for example, a user may use a computer to connect to terminal server software (access point) running on another computer (or a farm of computers), so as to gain access to applications and/or other computers.

As used herein, a "user" may be a person or computer attempting to execute a legacy or other application, and/or its related data records, on a computer system. Users may be authorized, i.e., having credentials for accessing an application and related data, or unauthorized, i.e., lacking such credentials.

As used herein, "states" (i.e., states of being) may indicate the current condition or status of an application or data, for example, a user being signed-on or signed-off, a screen being open or closed, an internet connection being present or not, etc. An administrator can define multiple states, depending on the levels of granularity and the extent of monitoring required, and can associate triggers with a particular state. States may be defined by the present status of an application in combination with past event or past states.

As used, herein, "submitting an audit" means recording the occurrence of an event in a computer file. The record typically includes a description of the event, the time/date of the event, the identity of the user, etc.

As used herein, "triggers" are events that cause transitions between states in a state engine, for example, the loading of a particular web page, the appearance of a window on the desktop, opening a file, attempting to change information in a file, etc. When a trigger fires the actions specified for that particular trigger are executed in a pre-defined sequence.

As used herein, users are "provisioned" when they are provided access to a computer system, typically with a set of rules and condition (i.e., policies) regarding use of the system, including its applications and data records. Users are often provisioned by a system's administrator.

As used herein, "data records" refer to any data file used by an application, including a legacy application. The data may be in a document, spreadsheet, graphics file phone list, financial record, computer-aided design (CAD) drawing or computer numerical control (CNC) file, or any other format used by computers. In some embodiment, the data records are in a format no longer supported by contemporary applications, requiring the use of a legacy application.

II. Access Agent for Tracking and Controlling Access in Legacy Systems

Embodiments of the present system, software, and methods relate to a configurable, third-party access agent (i.e., computer software system/platform) for tracking and controlling electronic access to programs or data without requiring modifications to the original operating systems and/or applications. The access agent is ideally suited for use with legacy systems used by financial institutions, retail and wholesale banks, the life insurance industry, old corporations, government agencies, and the like. The access agent is also useful in mitigation and remediation in the event of an access violation.

The access agent runs on a computer system, such as a personal computer (PC), a personal desktop assistant (PDA), a network computer server, or equivalent, or on a computer controlling a network computer server. In exemplary embodiments, the access agent becomes part of the server architecture. Each user registers with the server, via the access agent. Each user accesses applications via the access agent, which authenticates their identification and enforces access control on network applications.

Each user has a set of attributes and policies recognized by the access agent. These attributes and policies may exist on the server, and the access agent periodically synchronizes with the server to obtain the latest set of attributes and policies. The user is then required to present the required authentication information and/or hardware to access applications and/or data. In high-security organizations, users may be required to register a smart card for use in authentication. In other organizations, users may be required to register a password, radio frequency identification (RFID) tag, finger print, one-time password generated by a token, or combinations and variations, thereof. One or more public-private key-pairs may be generated, with the private key being placed in the possession of the registered user. Where smart cards are used, the private keys can be embedded in the card.

In some embodiments, the access agent is equipped with various templates for communicating with different applications and data records, called access profiles, which allow application tracking and controlling conditions to be selected, and optionally further configured, from a pre-defined list. These access profiles guide the access agent when introduced into a new environment, e.g., a server of a particular corporation or organization with its unique suite of programs and data records. An access profile provides (i.e., specifies) one or more state engines (or engines), which define a set of states, triggers and actions for tracking and controlling access to an application and related data records. The access agent may periodically synchronize with a server to obtain the latest set of access profiles.

Examples of states include an application being open or closed, a window being collapsed or expanded, and a dialog box being present or not. Examples of triggers include the process of opening a file or accessing a particular screen relating to a program. Examples of actions include submitting an audit log or clicking a button or hyperlink. Some of the actions triggered by the access agent require managing user credentials such as user names, passwords, digital certificates, personal information, and the like. The particular states, triggers and actions can be further refined based on a user's attributes (e.g., seniority, capacity, security clearance, etc. and a company or organization's use policies and access rules).

In some embodiments, the access agent is also equipped with a generic, rule-based engine, in which generic rules are defined for use by the access agent. If there is no access profile available for an application, the access agent uses these general rules to learn the application's screens and take appropriate actions. For example, the access agent may learn an application's confidential data screen and capture a screenshot to be sent to the server as audit logs.

In some embodiments, the access agent is also equipped with an audit logging module that reports audit logs to the server. In this manner, all activities can be tracked and controlled, regardless of whether they are performed by typical users, operators, helpdesks, or system administrators. In this manner, the system, software, and methods support the real-time tracking of an almost unlimited number of defined events, or combinations, thereof. These events may relate to a single application or to multiple applications, and may occur simultaneously, in a single computer session, or at different times or dates. Moreover, the access agent allows appropriate actions to be taken to safeguard access to legacy application and data in real-time, thereby controlling, as well as tracking access.

The present system, software, and methods may be understood with reference to FIG. 1, which illustrates a typical server arrangement. In this example, a server 100, is in communication with several workstations 110, 120, 130, 140, a remote access server 160, and a terminal server 170, one or more of which may be used by users 180 to access various applications, including legacy applications. A users 180 gain access to applications and related data records through an access agent running on the server 100 or access point to the server, such as the remote server 160 or terminal server 170. An administrator 190 is granted additional rights with respect to accessing applications and data records from his or her workstation 140. In this example, workstation 140 is connected to the server 100 via the remote access server 160.

Figure 2:
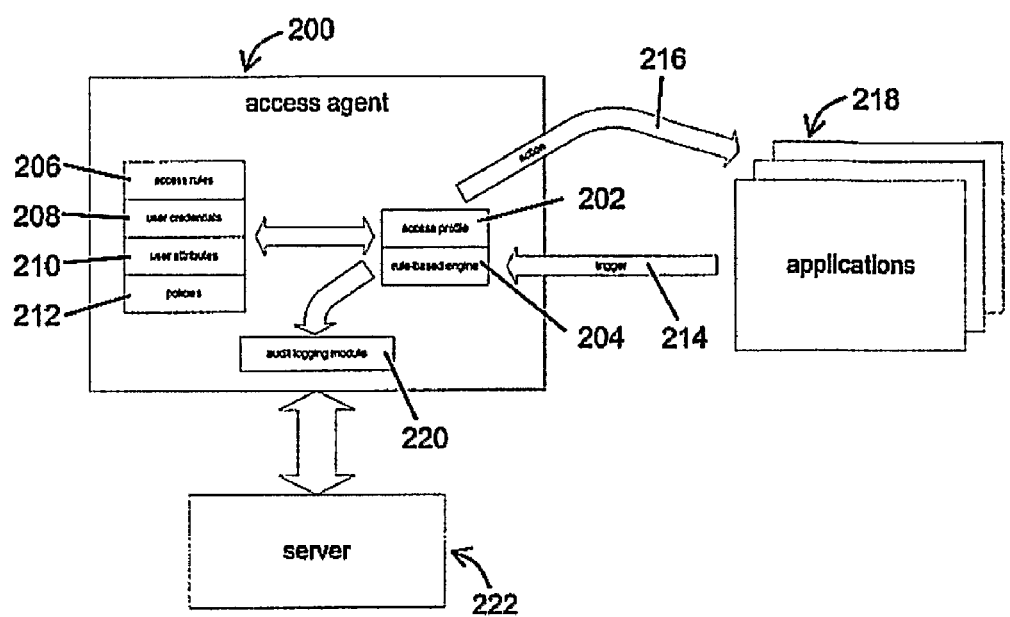
FIG. 2 is a diagram showing components of the access agent and how it interacts with applications.

FIG. 2 shows a schematic diagram of the functions and connections of an exemplary access agent. The access agent 200 includes an access profile 202 and a rule-based engine 204, which uses information including access rules 206, user credentials 208, user attributes 210, and policies 212 to specify states (not indicated) triggers 214 and actions 216 for tracking and controlling access to applications 218 (e.g., legacy applications). The access agent 200 includes an audit logging module 220 for logging audits with a server 222.

Various features and exemplary embodiments of the present system and methods are described in further detail, below.

III. Engine for Tracking and Controlling Applications

In certain embodiments, the access agent includes a state engine, functioning as event-driven, finite state machine, which enables an administrator to track and control legacy applications. The state engine (or engine) specified by an access profile defines one or more states, which are related to event triggers, which control any number of actions (including no action), which may be executed in a particular order or in any combination, depending on the particular actions defined. After executing the actions in response to the trigger, the state engine transitions to a next state, where the next state can be any state including the current state.

In some embodiments, each access profile specifies of one or more engines, which define states, triggers, and actions for tracking and controlling applications. The interactions among states, triggers, and actions determine how automatic operations occur for a particular access profile. These interactions can be understood through the following exemplary illustration:

a. When an application launches, it is in a start state. With the appearance of the logon window, a trigger is fired, affecting actions, such as automatically filling-in logon credentials (e.g., obtained from a user's credentials) and submitting an audit log for the logon event.

b. The application arrives at a logged-on state defined in the access profile. A trigger is activated, e.g., when the user chooses to view some confidential data for which authorization was not provided. The consequent action is to close the window showing the confidential data, followed by a second action of submitting an audit log that contains the user's information as well as that of the data record for which access was attempted. A third action sends an alert to the administrator, e.g., via email.

c. The application now assumes the unauthorized-access state. A trigger is activated, and the action is to monitor all the user's activities. The particular action may be to capture screenshots from the user's computer terminal/station, and submit them as audit logs.

d. When the user clicks on the logoff button, a trigger is fired, which brings the engine back to the start state. The action is to submit an audit log for the logoff event.

In the exemplary application described above, and in other embodiments, the triggers and actions are controlled by various company/organization policies, user attributes, and historical context. Such variables/parameters include the user's particular role, function, title, group membership, security clearance, or other credentials; the authentication requirements for a particular user; the authentication requirements for access from a remote location; the types of data that a particular user can access; the type of data/object being manipulated; the event history of the application or data file; a user's audit log history (e.g., whether the user has already performed a similar action on another application within the last hour); the current time of day; the day of the week; the allowed logon time for a particular user; the IP address of the machine accessing the application or data; and whether the machine has network connectivity.

Access rules that combine any number of the above policies, user attributes, and historical context, can be defined on the server. An example of such a rule in psuedo-code is:

Close the application if ((machine's IP address belongs to external network) and (user's role is not Administrator) and ((day of week is Saturday or Sunday) or (current time is not office hours))).

In some embodiments, the engine defines the action of capturing a user's logon credentials from an application screen. In some embodiments, the engine defines the action of automatically filling-in a user's logon credentials in the legacy application logon fields.

In some embodiments, the engine, upon verifying a user name and password, defines the action of automatically issuing a digital certificate to a user for use in accessing a legacy application requiring a certificate. In some embodiments, the engine defines the action of automatically logging on to a certificate-enabled application using the user's digital certificate and related credentials.

In other embodiments, the engine, upon verifying a user name and password, defines the action of automatically generating a one-time password (OTP), or single sign-on password, to a user for use in accessing a legacy application requiring an OTP or single sign-on password. In some embodiments, the engine defines the action of automatically logging on to an application using the user's OTP or single sign-on password.

In other embodiments, the engine defines the action of automatically prompting for a USB token and verifying the token ID before automatically filling-in a user's logon credentials; prompting for a USB smart card token and PIN and verifying the token ID and PIN before automatically filling-in a user's logon credentials; prompting for an RFID card and verifying the RFID before automatically filling-in a user's logon credentials; and/or prompting for a fingerprint and verifying the fingerprint before automatically filling in a user's logon credentials.

In some embodiments, the engine defines the action of saving the captured logon credentials; copying information from one application field to another or from a field in one application to a field in another application; automatically clicking on a menu item of an application (e.g. a Windows or web menu item); notifying the user and/or system administrator of successful logoff or logon to a legacy application; prompting a pop-up dialog box for use by a user to enter logon credentials (e.g., for logon or changing a password), or allowing the access agent to capture a user's logon credentials from the pop-up dialog box instead of a legacy application screen.

In further embodiments, the engine defines the action of executing a user-defined, custom script, where the script can be written in any scripting language, e.g., VBScript and JavaScript.

In some embodiments, the engine defines the action of starting and/or stopping capturing the computer's keyboard inputs. In some embodiments, the engine defines the action of automatically setting the status (i.e., checked or unchecked) of a checkbox in an application. In some embodiments, the engine defines the action of automatically configuring audit logs for a user action, where the action name is configurable.

In some embodiments, the engine defines the action of automatically clicking on a window in a computer, where the window can be in the foreground or background (e.g., of a computer desktop). In related embodiments, the engine defines the action of automatically closing a window in a computer, where the window can be in the foreground or background. In some embodiments, the engine defines the action of automatically sending a sequence of keyboard inputs to a window, where the window can be in the foreground or background.

In some embodiments, the engine defines the action of disabling a widget in a window, where the window can be in the foreground or background. In related embodiments, the engine defines the action of hiding a widget in a window, where the window can be in the foreground or background. In related embodiments, the engine defines the action of closing a widget in a window, where the window can be in the foreground or background. In some embodiments, the engine defines the action of disabling a menu item in a window, where the window can be in the foreground or background. In related embodiments, the engine defines the action of disabling a sub-menu item in a window, where the window can be in the foreground or background. In some embodiments, the engine defines the action of blocking keyboard input to a window or a widget in a window. In related embodiments, the engine defines the action of blocking mouse input to a window or a widget in a window.

In some embodiments, the engine includes a trigger that is fired when a user logs on to the access agent on the computer; when a user logs off from the access agent on the computer;

upon expiry of a configurable duration; when a mainframe or terminal application outputs certain configurable text on the screen; when a high level language (HLL)-compatible mainframe or terminal application session starts; when there is a change in the caret position for a mainframe application; when there is change in a configurable text at a certain configurable location of a window for a mainframe or terminal application; when a web browser starts navigating to a URL; when a Web browser is closed; when a particular HTML element is clicked on a web page in a web browser; when a particular web page begins downloading or is fully downloaded in a web browser; when a particular HTML element begins loading or is fully loaded in a Web browser; when a particular HTML element is clicked on a web page; when a window is activated; when a button is clicked on a window; when the left mouse button is clicked; when a window is created, destroyed, or hidden; when a key or combination of keys on a keyboard are pressed; when the cursor moves on a particular window; when a particular input field on a window is clicked; when the position of a window is changed; when a checkbox item is set (e.g., checked or unchecked); or even without a particular condition.

These states, triggers, and actions are merely for illustration. The number of possible states, triggers, and actions is essentially unlimited.

In some embodiments, the access agent is installed on all access points used for accessing enterprise applications and resources. These include PCs, notebooks, personal desktop assistants (PDAs), cell phones, enterprise portals, remote access servers, terminal servers, etc. Enterprise portals and remote access servers may include web-based systems that enable users to access applications using the web browsers. In some embodiments, the access agent obtains access profiles, access rules, user credentials, user attributes, historical context, and/or policies from the server.

The system administrator can track any combination of end-point events across applications; report and log these events to one central server; manipulate the user interface of applications, such as disabling a button, enabling a hot key, etc.; perform additional actions such as sending alerts, displaying dialog prompts, taking screen snapshots, etc.; all without the need to modify existing operating systems and/or applications.

IV. Access Profiles

An access profile contains information relating to how tracking and controlling is performed for a particular application. An application can take the form of, e.g., an executable program running on the user's computer; a web-based application running on a web server and accessed through a web browser; a terminal application running on a terminal server and accessed through a terminal client; or a mainframe application running on a mainframe and accessed through a mainframe emulator or a Java client.

Information present in the access profile includes, e.g., how to identify the application and the specification of an engine for tracking and controlling the application as in the case of an event-driven, finite state machine. The engine specification defines states, and for each state, associated triggers, and for each trigger, associated actions. Each trigger should include a reference to the next state as well as the application/operating system event associated with the trigger.

To simplify the creation of access profiles, an access profile development tool (i.e., software) may be used to automatically generate access profiles based on simple instructions from the administrator, and upload these access profiles to the server. The development tool may allow an administrator to enhance an access profile by modifying certain fields in self-explanatory forms or by manipulating a graphical representation of the engine. The development tool may further allow an administrator to inspect an application so as to tag various screens and fields with meaningful labels such as "confidential," "sensitive," and "secret," which can be used to define access rules. An example of such an access rule (in pseudo-code) is:

Hide field if ((tagged "secret") and (user is not a "top executive")).

In this manner, only top executives are permitted to access documents having pages marked "secret."

V. Rule-based Engine

In some embodiments, the access agent includes a rule-based engine defining generic rules to be used by the access agent. This embodiment may utilize artificial intelligence techniques, which are known in the art. Where there is no access profile available for a particular application, the access agent uses these general rules to learn the application's screens and take an appropriate action. For example, the access agent may look for an edit control of the "password" type to identify a logon screen of an application. In another example, the access agent may look for a general text signature, such as the text "authorized user access only," to identify a particular application screen as one that contains confidential data. When the rule-based engine identifies such a screen, it can capture a screenshot to be sent to the server as audit logs, together with the information of the user accessing the application.

In some embodiments, the generic rule-based engine automatically detects a password field in a window screen or web page, interprets that field as the password field, and interprets the previous editable field as the user name field for the application logon.

VI. Audit Logging Module

In some embodiments of the system, software, and methods, the access agent includes an audit logging module for accumulating audit logs. This allows the tracking of application access to be carried out even if the computer is offline or the server is down. When a network connection with the server is established, the audit logging module will send these accumulated audit logs to the server, where they are preferably made "tamper-evident" by using some form of hash-chaining technique, i.e., where each log record contains a hash value derived from the current and previous log record contents, and signed with the server's log signing private key.

In some embodiments, the access agent is able to enforce fine-grain auditing of application access. This can be achieved using an engine that closely monitors user activities, such as data modification and the activation of particular application features.

VII. Role-based Access Control and Protection of Confidential Data

In some embodiments, the access agent is able to impose role-based access control on an application without the need to modify it. In this manner, only authorized personnel are permitted to access confidential data. For example, users of a particular role in the company or organization (e.g., an "operator" or "assistant") are not allowed to use a particular function of an application (e.g. "export" or "print"). When such a user logs on to the application, right-clicks on a data record, and selects the "export" function, the export dialog prompt appears on the screen. The access agent recognizes the export dialog prompt and fires a trigger that performs several actions, such as closing the export dialog screen; informing the user that use the "export" function is not permitted; sending an email alert to the administrator; and submitting an audit log entry to the server.

VIII. Real-time Segregation of Duty Enforcement

In some embodiments, the access agent is able to enforce real-time segregation of duty on applications without the need to modify them. This can be achieved using the engine. For example, in a particular purchase order (PO) system, any POs generated and paid by the same person are tracked and alerts are sent to the administrator or appropriate person. Where this particular user logs on to a PO module, to create a PO, and then logs on to a different application, or different screen of the application to pay the PO, the access agent fires a trigger that compares the PO information and performs defined actions, such as prompting the user that he is not allowed to pay the PO; sending an email alert to the administrator; and submitting an audit log entry to the server.

IX. Time-based Access Control

In some embodiments, the access agent is able to enforce time-based access control on an application without the need to modify it. For example, some users may not be allowed to log on to an application after normal office hours. When a user attempts to log on to the application after office hours, the access agent recognizes the application's logon prompt and fires a trigger that checks the system for the current time and normal office hours. The trigger may affect several actions, such as closing the application immediately; prompting the user that access is not permitted during this time; sending an email alert to the administrator; and submitting an audit log entry to the server.

X. Context Synchronization

In some embodiments, the access agent is able to enforce context synchronization among several applications without the need to modify them. Context synchronization refers to the synchronization of application states among a group of applications. For example, in a healthcare company or organization, several different applications may be used for viewing or manipulating different aspects of patient information, such as medical history, X-ray and MRI images, prescriptions, referrals, test results, etc. Where multiple applications and files must be opened simultaneously, there is greater risk for mistakes and improper treatment. To prevent the possibility of a medical professional reading the medical history of one patient and viewing the MRI images of a different patient, the present system and methods provide a mechanism for ensuring that the applications always show information about the same patient at any point in time.

Context synchronization can be achieved through the engine. For example, where a user has launched, a word processing program for reviewing patient A's medical history and then attempts to open patient B's MRI file in a picture viewing application, the access agent recognizes the attempt to access the records of different patients and fires a trigger which affects several actions, such as warning the user of the potential risk of error or automatically navigating the picture viewing application to the MRI file of patient A.

XI. Protection Against Illegal Access, Tampering, and Bypassing

A. Safeguarding the Access Agent

Since the access agent is central to the tracking and controlling of applications and data, some embodiments of the invention incorporate safeguards to block attempts to circumvent and/or disable (herein, "kill") the access agent. For example, in network systems, the access agent can be run as an operating system process so that normal users, who do not have rights to kill system processes, will not be able to kill the access agent. Only system administrators or other authorized users will be able to kill the access agent.

In further embodiments, as an added measure of security, the access agent can attempt to identify events that may lead to its process being killed (i.e., weaknesses in security), and perform actions to overcome the weaknesses and/or notify the system administrator of the weaknesses.

Since tampering may involve the system clock or network settings, the access agent in some embodiments can use a number of defensive techniques to detect attempted tampering. For example, if online, the access agent repeatedly synchronizes its clock with the server. If offline, the access agent employs one of a number of known methods for detecting clock changes, e.g., affected by unauthorized users. If tampering is detected or suspected, the access agent can potentially block access to all applications until it regains online contact with the server to synchronize its clock and/or communicate the detected or suspected unauthorized access. Similar techniques can be applied for detecting the tampering of a computer's network name or address.

In further embodiments, the access agent may need to obtain user attributes, historical information, and other information obtained in communication with the server to determine whether a particular user, or group of users, should be allowed access to applications. In particular embodiments, when a user attempts to sever the network connection between the access agent and the server, the access agent can disallow access to applications by a particular user, or to a group of users, if it fails to perform the required safeguard checks.

A way to prevent users from accessing applications from computers without the access agent installed is to randomize the passwords for all applications. In some embodiments, random passwords are generated by the present system and methods, e.g., when users are provisioned. These random passwords are stored as user credentials on the server, which are then used by the access agent to log on to applications on behalf of properly credentialed users. In preferred embodiment, users do not have access to these random passwords, and are, therefore, unable to log on to applications without using the access agent. In some embodiments, the access agent or server periodically contacts the applications to change the random passwords.

To prevent administrators from configuring the system such that their own actions are not tracked and controlled, some embodiments include an implementation to designate a security officer to authorize or audit changes to system configuration.

B. Safeguarding Audit Logs

The audit logging module typically accumulates audit logs in an encrypted form, i.e., using a user's cryptographic keys, when it is not connected to the server. These audit logs can be written to a file that normal users do not have rights to access, so as to protect data from being deleted or changed. In some embodiments, as an added security measure, the access agent can attempt to identify events that could lead to the deletion of such protected files, and perform actions to overcome these weaknesses in the system.

In some embodiments, audit log files are made tamper-evident on the server, e.g., using some form of hash-chaining technique, wherein each log record contains a hash value derived from the current and previous log record contents, and is signed with the server's log signing private key. The system administrator or security officer can be alerted of any changes made to the audit logs.

C. Safeguarding Access Profiles

Since access profiles contains information relating to how tracking and controlling is performed for a particular application, it is a security concern as a target for malicious software, which can potentially be written using a plug-in platform. It is therefore desirable to ensure that only trusted plug-ins are executed, using, for example, known code signing techniques. Plug-ins should be checked for tampering before execution. An implementation can designate a security officer to perform the code signing of access profiles, so that even administrators cannot bypass the system by modifying access profiles such that their actions are not tracked or restricted.

XII. Access Automation

Besides tracking and controlling access to applications, the present system and methods can also be used to automate processes involving applications and data records, such as automating a sequence of actions in an application so as to assist user in performing common tasks (e.g., deleting temporary internet files after using a web browser); assisting an administrator in provisioning the same user in multiple applications using information provided in one application; enhancing an application by performing additional data processing of data (e.g., automatically validating or modifying user-input data); and requiring additional authentication when a user accesses certain functions of an application (e.g., when a user attempts to access the health records of a famous person), such as requesting additional user authentication or requiring a password or number generated by a token.

The present system and methods can also be applied to tracking and controlling file manipulations (e.g., by password protecting any text or data file); tracking and controlling network events; and tracking and controlling physical events (e.g., power failures, disconnection from a server, rebooting, the granting of stock options, payment of invoices, employee termination, retirement, sick leave, etc.) and correlating them with electronic events.

The foregoing description and appended claims illustrates features and uses of the present system, software, and methods, and is not intended to be limiting. Additional features and embodiments will be apparent to one skilled in view of the present description.

What is claimed is:

1. Software for tracking and controlling access to legacy applications and/or related data records on a computer system using a state engine to define a set of states, triggers, and actions for use by an access agent running on an access point of the computer system to track and control user access to the legacy applications and/or related data records without modifying the legacy application and/or related data records, wherein the access agent comprises:

one or more access profiles with instructions for identifying the legacy application and specifying one or more state engines for tracking and controlling access to the application, the state engine specifying the set of states, triggers, and actions for tracking and controlling access to the legacy application, wherein:

a logging module, of the access agent, reports audit logs to a server, to which the access agent is in communication, instructions for the logging module to report audit logs to the server are provided in the one or more access profiles, and the logging module accumulates audit logs when it is not connected to the server, thereby allowing the tracking of access to applications even if the computer is offline or the server is down.

2. The software of claim 1, comprising a rule-based engine for defining states, triggers, and actions for use in tracking and controlling the legacy applications.

3. The software of claim 1, wherein the audit logging module records user access to the legacy application.

4. Software for tracking and controlling electronic access to legacy applications and/or related data records on a computer system without modifying the legacy applications and data records, the software comprising:

an access agent running on an access point in the computer system and controlling user access to legacy applications and related data records, the access agent comprising:

one or more access profiles with instructions for identifying a legacy application and specifying one or more state engines for tracking and controlling access to the application, the state engine specifying a set of states, triggers, and actions for tracking and controlling access to the legacy application, wherein the access agent tracks and controls user access to legacy applications and related data records without modifying the legacy application, wherein:

a logging module, of the access agent, reports audit logs to a server, to which the access agent is in communication, instructions for the logging module to report audit logs to the server are provided in the one or more access profiles, and the logging module accumulates audit logs when it is not connected to the server, thereby allowing the tracking of access to applications even if the computer is offline or the server is down.

5. A computer method for tracking and controlling electronic access to a legacy application or related data records running on a computer system, without modifying the legacy applications or data records, the method comprising:

defining a set of states, triggers, and actions for tracking and controlling access to the legacy application, and controlling user access to the legacy application and related data records using the states, triggers, and actions, wherein user access to the legacy applications and data records is tracked and controlled without modifying the legacy applications and data records, and wherein the states, triggers, and actions are specified by one or more state engine specifications in an access profile for use by the access agent running on an access point of the computer system to track and control access to the legacy application, wherein:

a logging module, of the access agent, reports audit logs to a server, to which the access agent is in communication, instructions for the logging module to report audit logs to the server are provided in the one or more access profiles, and the logging module accumulates audit logs when it is not connected to the server, thereby allowing the tracking of access to applications even if the computer is offline or the server is down.

6. The method of claim 5, wherein the states, triggers, and actions are used by an access agent running on an access point of the computer system to track and control access to the legacy application.

7. A system for tracking and controlling access to a legacy application in a network computer environment, the system comprising:

a computer-implemented access agent running on an access point in a network computer environment controlling user access to a legacy application and related data records, the access agent comprising:

one or more access profiles with instructions for identifying a legacy application and specifying one or more state engines for tracking and controlling access to the application, the state engine specifying a set of states, triggers, and actions for tracking and controlling access to the legacy application, wherein the access agent tracks and controls user access to the legacy application and related data records using the states, triggers, and actions specified by the state engine, without modifying the legacy application, wherein:

a logging module, of the access agent, reports audit logs to a server, to which the access agent is in communication, instructions for the logging module to report audit logs to the server are provided in the one or more access profiles, and the logging module accumulates audit logs when it is not connected to the server, thereby allowing the tracking of access to applications even if the computer is offline or the server is down.

8. The system of claim 7, wherein the server stores user attributes and policies for use by the access agent.

9. The system of claim 7, wherein the server stores access profiles, and the access agent periodically synchronizes access profiles with the server.

10. The system of claim 7, wherein the access agent further comprises a general rule-based engine for defining states, triggers, and actions for use in tracking and controlling legacy applications for which access profiles have not been defined.

11. The system of claim 7, wherein the logging module records user access to the legacy application.

12. The system of claim 7, wherein the logging module accumulates audit logs in an encrypted form.

13. The system of claim 7, wherein one or more triggers is determined by information selected from a company/organization policy, a user attributes, and historical context.

14. The system of claim 7, wherein one or more actions is selected from disabling a widget in a window, hiding a widget in a window, closing a widget in a window, disabling a menu item in a window, disabling a sub-menu item in a window, blocking a keyboard input to a window, blocking a widget in a window, blocking a mouse input to a window, and blocking a widget in a window.

15. The system of claim 14, wherein the window is in the background.

16. The system of claim 14, wherein the window is in the foreground.

17. The software of claim 4, wherein each of a plurality of access points of a data processing system comprises an access agent, and wherein each access agent comprises an access profile for each of a plurality of possible applications with which the access agent operates, and wherein the access profile of each access agent specifies at least one application with which the access profile operates and one or more state engines that operates with the at least one application.

18. The software of claim 17, wherein each access agent of each of the plurality of access points compiles audit logs of actions performed by an application with which the access agent operates and communicates the audit logs to a server.

19. The software of claim 4, wherein the access agent enforces a segregation of duties with regard to the application without performing a modification to the application.

* * * * *